United States Patent
Hong et al.

(10) Patent No.: US 7,643,560 B2
(45) Date of Patent: Jan. 5, 2010

(54) SYSTEM AND METHOD FOR SCALABLE VIDEO CODING USING TELESCOPIC MODE FLAGS

(75) Inventors: Danny Hong, New York, NY (US); Alexandros Eleftheriadis, Tenafly, NJ (US); Ofer Shapiro, Fair Lawn, NJ (US)

(73) Assignee: Vidyo, Inc., Dallas, TX (US)

( * ) Notice: Subject to any disclaimer, the term of this patent is extended or adjusted under 35 U.S.C. 154(b) by 0 days.

(21) Appl. No.: 11/877,531

(22) Filed: Oct. 23, 2007

(65) Prior Publication Data

US 2008/0101470 A1    May 1, 2008

Related U.S. Application Data

(60) Provisional application No. 60/862,510, filed on Oct. 23, 2006.

(51) Int. Cl.
*H04N 7/18* (2006.01)
(52) U.S. Cl. .......................... 375/240.25; 375/240.12; 375/240.14
(58) Field of Classification Search ................................ 375/240.11–240.29
See application file for complete search history.

(56) References Cited

U.S. PATENT DOCUMENTS

2008/0165848 A1* 7/2008 Ye et al. ................ 375/240.13

* cited by examiner

*Primary Examiner*—Andy S Rao
(74) *Attorney, Agent, or Firm*—Baker Botts, LLP

(57) ABSTRACT

Systems and methods for scalable video coding using special inter-layer prediction modes (called telescopic modes) are provided. These modes facilitate accelerated operation of encoders with improved coding efficiency.

21 Claims, 9 Drawing Sheets

Scalable Video Communication System

FIG. 1: Scalable Video Communication System
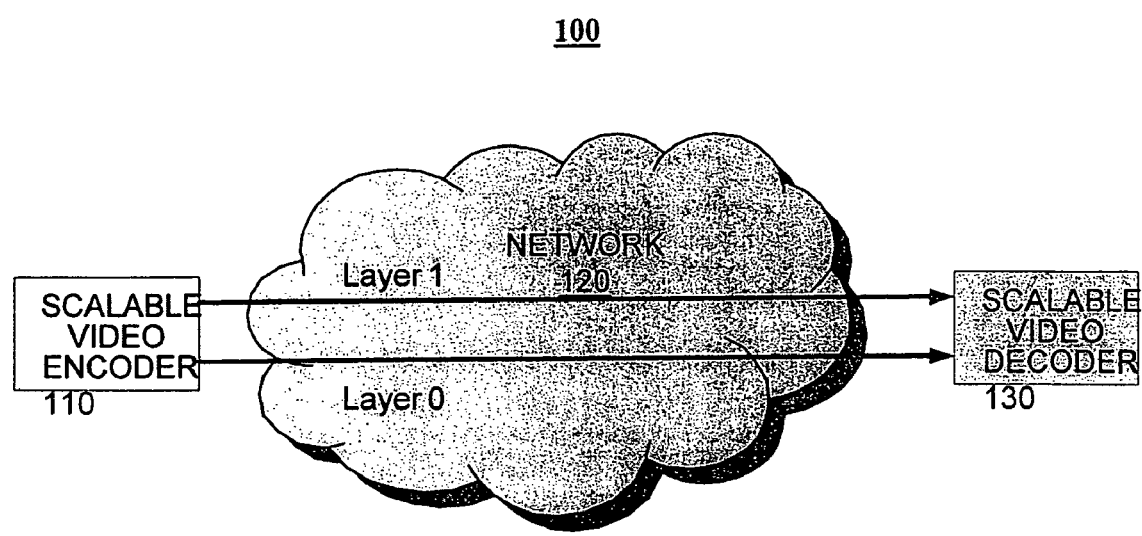

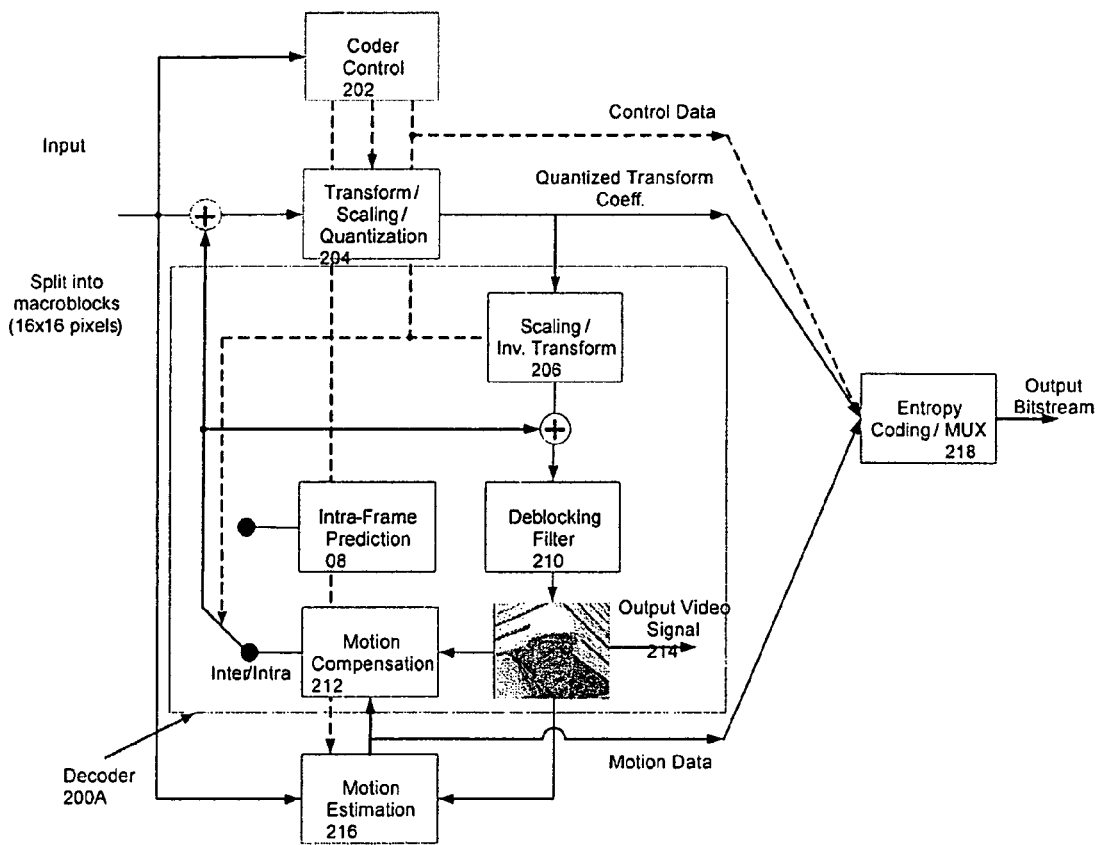
FIG. 2: Single-Layer Video Encoder

FIG. 3: Single-Layer Video Decoder
300
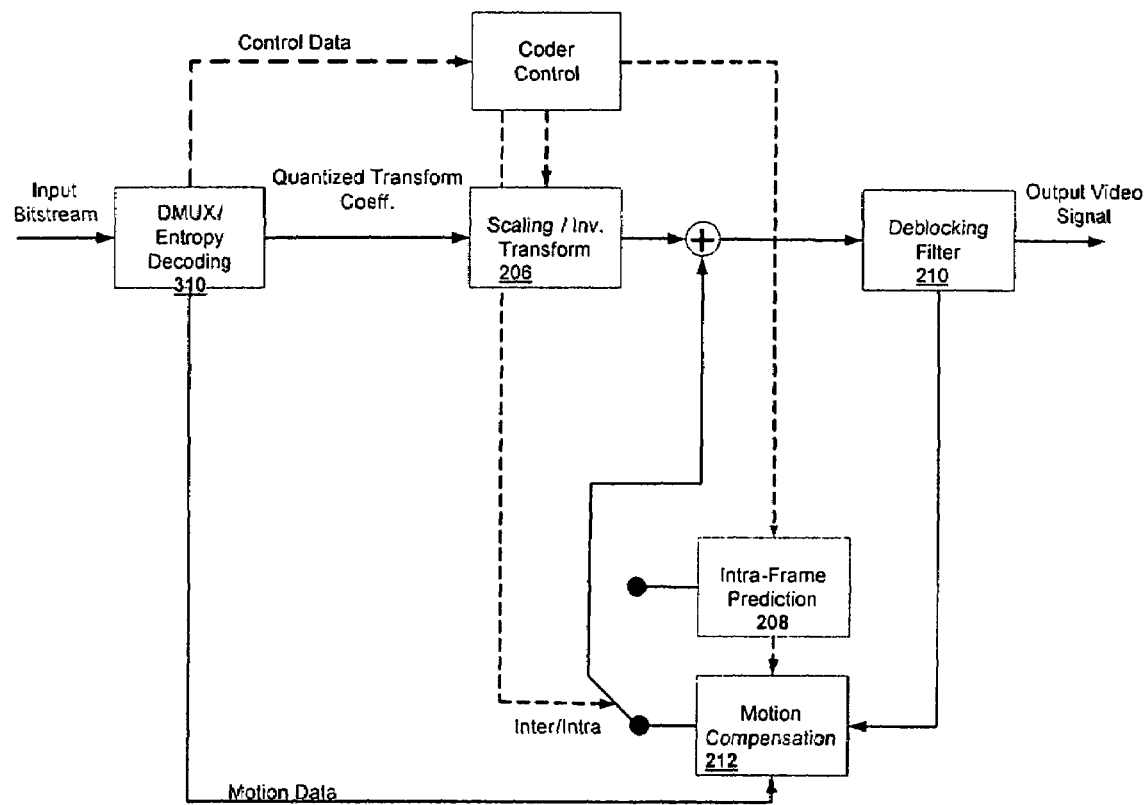

FIG. 4: Quality Scalability Encoder
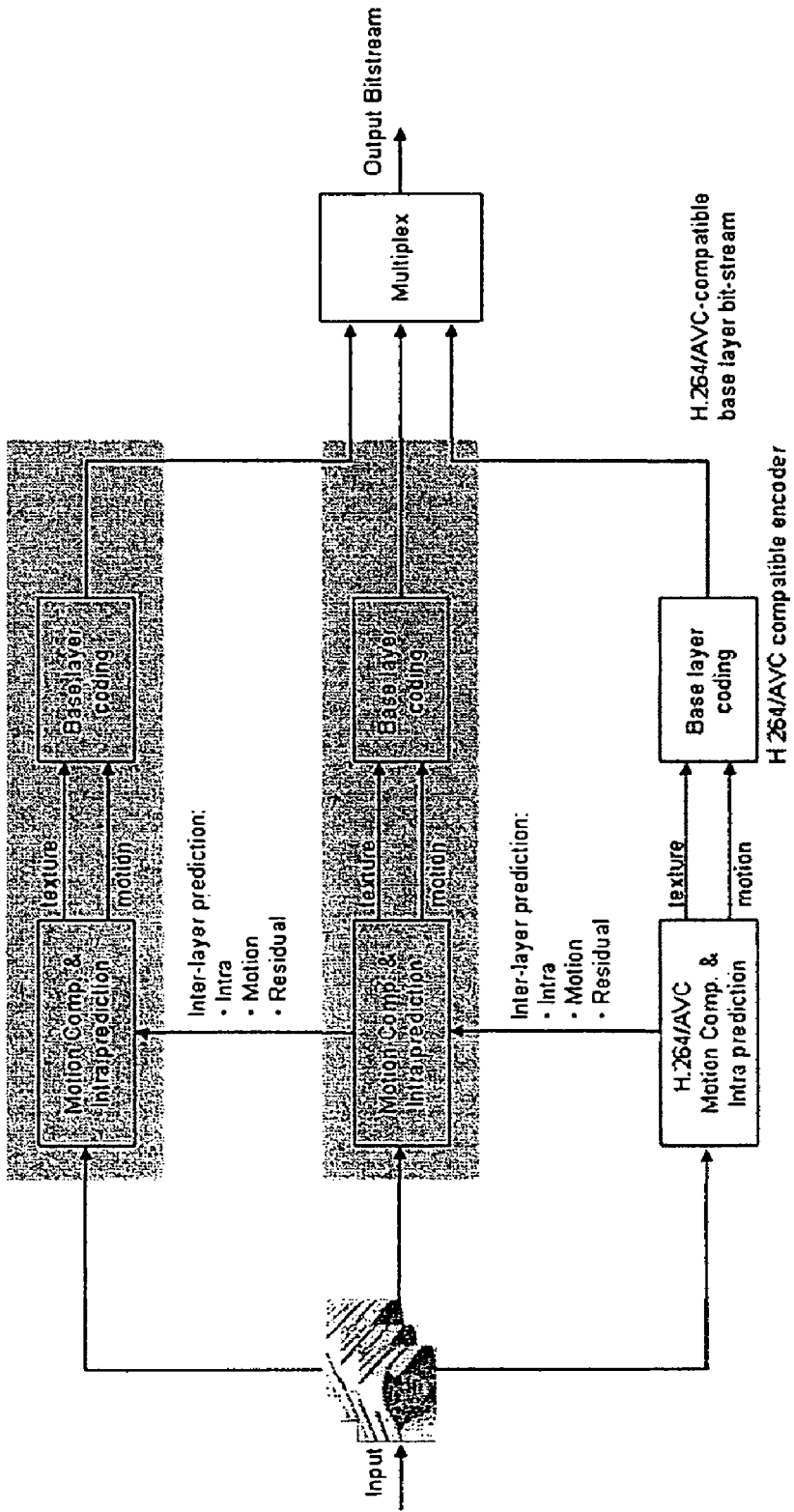

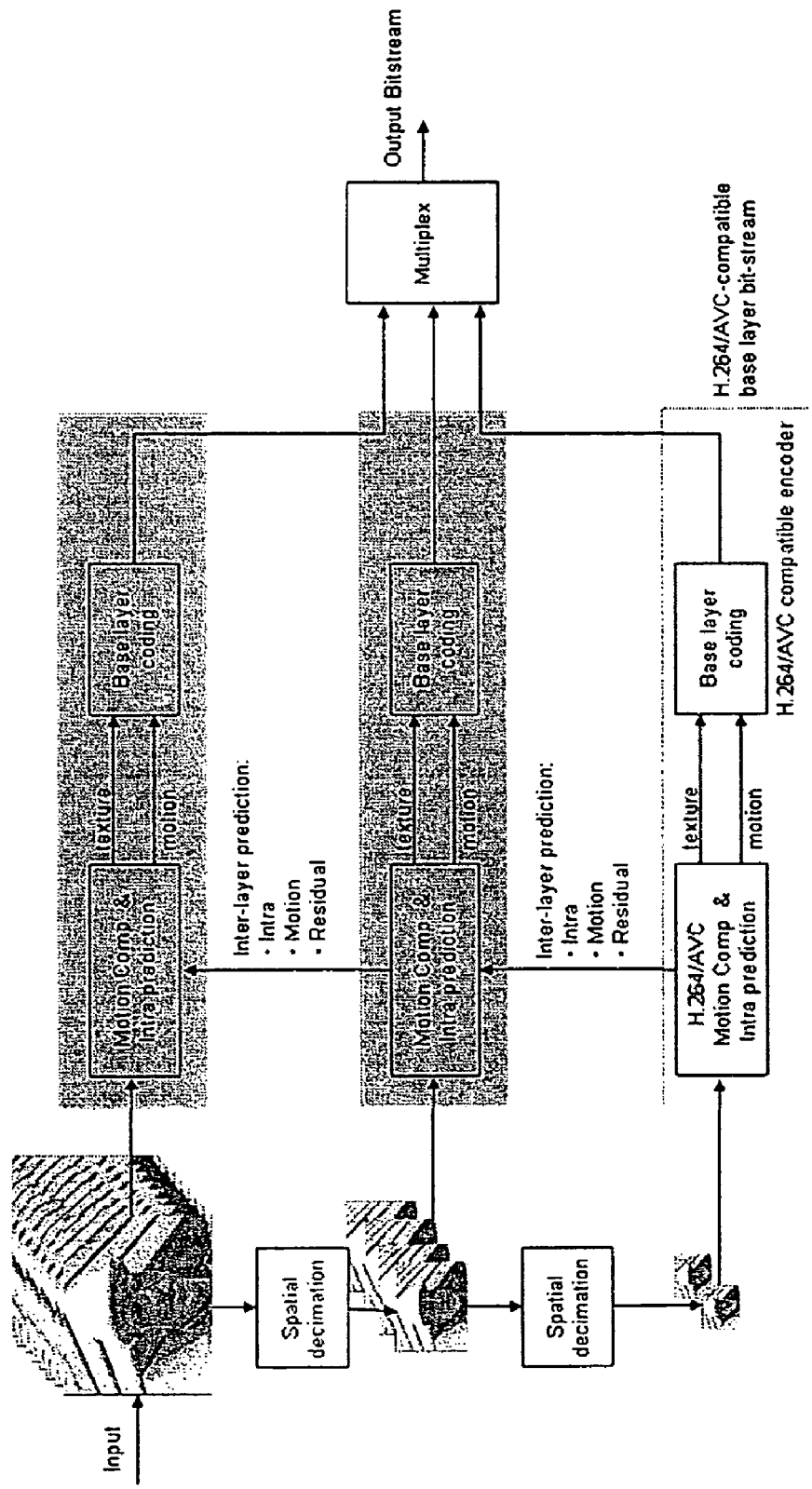
FIG. 5: Spatial Scalability Encoder

FIG. 6: Syntax and semantics for the adaptive_residual_prediction_flag in SVC JD7

600
Syntax

Section G.7.3.4

| | | |
|---|---|---|
| ... | | |
| if( base_id_plus1 != 0 ) { | | |
|     adaptive_prediction_flag | 2 | u(1) |
|     adaptive_residual_prediction_flag | 2 | u(1) |
| } | | |
| ... | | |

Section G.7.3.6.3

| | | |
|---|---|---|
| ... | | |
| if ( adaptive_residual_prediction_flag &&<br>    MbPartPredType( mb_type, 0 ) != Intra_16x16 &&<br>    MbPartPredType( mb_type, 0 ) != Intra_8x8 &&<br>    MbPartPredType( mb_type, 0 ) != Intra_4x4 &&<br>    MbPartPredType( mb_type, 0 ) != Intra_Base ) { | | |
|     residual_prediction_flag | 3 \| 4 | u(1) \| ae(v) |
|     if ( residual_prediction_flag && base_mode_flag &&<br>        constrained_inter_layer_pred( ) ) | | |
|         smoothed_reference_flag | 3 \| 4 | u(1) \| ae(v) |
| } | | |
| ... | | |

Semantics

Section G.7.4.4

...

adaptive_prediction_flag specifies the presence of syntax elements in the macroblock layer in scalable extension. When this syntax element is not present, it shall be inferred to be equal to 0.

adaptive_residual_prediction_flag specifies the presence of the residual_prediction_flag in the macroblock layer in scalable extension. When this syntax element is not present, it shall be inferred to be equal to 0.

FIG. 7: Syntax and semantics for complete telescopic mode signaling in SVC JD8

700

Syntax

Section G.7.3.4

| | | |
|---|---|---|
| ref_pic_list_reordering( ) | 2 | |
| if ( !layer_base_flag ) { | | |
|     base_id | 2 | ue(v) |
|     adaptive_prediction_flag | 2 | u(1) |
|     if ( !adaptive_prediction_flag ) | | |
|         default_base_mode_flag | 2 | u(1) |
|         if( !default_base_mode_flag) { | | |
|             adaptive_motion_prediction_flag | 2 | u(1) |
|             if ( !adaptive_motion_prediction_flag ) | | |
|                 default_motion_prediction_flag | 2 | u(1) |
|         } | | |
|     adaptive_residual_prediction_flag | 2 | u(1) |
| | | |
| } | | |
| | | |

Section G.7.3.6.1

| | | |
|---|---|---|
| if( layer_base_flag == 0<br>  && in_crop_window( CurrMbAddr )<br>  && adaptive_motion_prediction_flag ) { | | |
|   for( mbPartIdx = 0; mbPartIdx < NumMbPart( mb_type ); mbPartIdx++) | | |
|     if( MbPartPredMode( mb_type, mbPartIdx ) != Pred_L1 ) | | |
|       motion_prediction_flag_l0[ mbPartIdx ] | 2 | u(1) \| ae(v) |
|   for( mbPartIdx = 0; mbPartIdx < NumMbPart( mb_type ); mbPartIdx++) | | |
|     if( MbPartPredMode( mb_type, mbPartIdx ) != Pred_L0 ) | | |
|       motion_prediction_flag_l1[ mbPartIdx ] | 2 | u(1) \| ae(v) |
| } | | |

Section G.7.3.6.2

| | | |
|---|---|---|
| if( layer_base_flag == 0<br>&&  in_crop_window( CurrMbAddr )<br>&&  adaptive_motion_prediction_flag ) { | | |
| for( mbPartIdx = 0; mbPartIdx < 4; mbPartIdx++ ) | | |
| if( SubMbPredMode( sub_mb_type[ mbPartIdx ] )  != Direct &&<br>SubMbPredMode( sub_mb_type[ mbPartIdx ] )  != Pred_L1 ) | | |
| motion_prediction_flag_l0[ mbPartIdx ] | 2 | u(1) \| ae(v) |
| for( mbPartIdx = 0; mbPartIdx < 4; mbPartIdx++ ) | | |
| if( SubMbPredMode( sub_mb_type[ mbPartIdx ] )  != Direct &&<br>SubMbPredMode( sub_mb_type[ mbPartIdx ] )  != Pred_L0 ) | | |
| motion_prediction_flag_l1[ mbPartIdx ] | 2 | u(1) \| ae(v) |
| } | | |

Section G.7.3.6.3

| | | |
|---|---|---|
| if ( adaptive_residual_prediction_flag  &&<br>slice_type  != I  &&  slice_type  != IE  &&<br>( base_mode_flag  \|\|<br>( MbPartPredType( mb_type, 0 )  != Intra_16x16  &&<br>MbPartPredType( mb_type, 0 )  != Intra_8x8  &&<br>MbPartPredType( mb_type, 0 )  != Intra_4x4  &&<br>in_crop_window( CurrMbAddr ) ) ) ) { | | |
| residual_prediction_flag | 3 \| 4 | u(1) \| ae(v) |
| if ( residual_prediction_flag && base_mode_flag ) | | |
| smoothed_reference_flag | 3 \| 4 | u(1) \| ae(v) |
| } | | |

FIG. 7 (continued)

FIG. 7 (continued)
Semantics

Section G.7.4.4 adaptive_prediction_flag equal to 1 specifies the presence of the base_mode_flag in the macroblock layer in scalable extension. adaptive_prediction_flag equal to 0 specifies the presence of default_base_mode_flag and adaptive_motion_prediction_flag in the slice header in scalable extension. When this syntax element is not present, it shall be inferred to be equal to 0.

default_base_mode_flag specifies the value of the base_mode_flag syntax element in the macroblock layer in scalable extension when base_mode_flag is not present. When default_base_mode_flag is not present, it shall be inferred to be equal to 0.

adaptive_motion_prediction_flag equal to 1 specifies the presence of the motion_prediction_flag_l0[ ] and the motion_prediction_flag_l1[ ] in the macroblock layer in scalable extension. When this syntax element is not present, it shall be inferred to be equal to 1.

default_motion_prediction_flag specifies the value of the motion_prediction_flag_l0[ ] and the motion_prediction_flag_l1[ ] syntax elements in the macroblock layer in scalable extension when motion_prediction_flag_l0[ ] and motion_prediction_flag_l1[ ] are not present. When this syntax element is not present, it shall be inferred to be equal to 0.

adaptive_residual_prediction_flag equal to 1 specifies the presence of the residue_prediction_flag in the macroblock layer in scalable extension. When this syntax element is not present, it shall be inferred to be equal to 0.

Section G.7.4.6 base_mode_flag equal to 1 specifies that mb_type for the current macroblock is inferred. The reference indices and motion vectors shall be inferred in dependence of the corresponding base macroblocks where applicable.
base_mode_flag equal to 0 specifies that mb_type is not inferred.
When base_mode_flag is not present, base_mode_flag shall be inferred as follows.

- If in_crop_window( CurrMbAddr ) is equal to FALSE, the value of base_mode_flag shall be inferred to be equal to 0.

- Otherwise ( in_crop_window( CurrMbAddr ) is equal to TRUE), the value of base_mode_flag shall be inferred to be equal to default_base_mode_flag in the slice header.

Section G.7.4.6.1 motion_prediction_flag_l0[ mbPartIdx ] equal to 1 specifies that the (possibly scaled) base motion vector(s) is/are used as motion vector predictor(s) for the list 0 motion vector(s) of the macroblock partition mbPartIdx. When motion_prediction_flag_l0[ mbPartIdx ] is equal to 1, the reference index ref_idx_l0[ mbPartIdx ] is inferred using the base reference index and the components of the motion vector(s) mvL0 are obtained by adding the motion vector differences mvd_l0[ mbPartIdx ][ ] to the (possibly scaled) base motion vectors.

When motion_prediction_flag_l0[ mbPartIdx ] is not present, motion_prediction_flag_l0[ mbPartIdx ] shall be inferred to be equal to default_motion_prediction_flag in the slice header.

motion_prediction_flag_l1[ mbPartIdx ] has the same semantics as motion_prediction_flag_l0[ mbPartIdx ], with l0 and list 0 replaced by l1 and list 1, respectively.

SYSTEM AND METHOD FOR SCALABLE VIDEO CODING USING TELESCOPIC MODE FLAGS

CROSS-REFERENCE TO RELATED APPLICATIONS

This application claims the benefit of U.S. provisional patent application Ser. No. 60/862,510 filed Oct. 23, 2006. Further, this application is related to International patent application Nos. PCT/US06/028365, PCT/US06/028366, PCT/US06/028367, PCT/US06/027368, PCT/US06/061815, PCT/US06/62569, PCT/US07/80089, PCT/US07/062357, PCT/US07/65554, PCT/US07/065003, PCT/US07/63335, and PCT/US07/81217. All of the aforementioned applications, which are commonly assigned, are hereby incorporated by reference herein in their entireties.

FIELD OF THE INVENTION

The present invention relates to video communication systems. In particular, the invention relates to communication systems that use scalable video coding techniques in which two or more layers are used to represent a given video signal at corresponding levels of fidelity in terms of the signal's temporal, quality, or spatial resolution.

BACKGROUND OF THE INVENTION

New digital video coding techniques, which are directed to general improvements in coding efficiency, have a number of new structural characteristics. Specifically, an important new characteristic is scalability. In scalable coding, an original or source signal is represented using two or more hierarchically structured bitstreams. The hierarchical structure implies that decoding of a given bitstream depends on the availability of some or all other bitstreams that are lower in the hierarchy. Each bitstream, together with the bitstreams it depends on, offers a representation of the original signal at a particular temporal, quality (i.e., in terms of Signal-to-Noise Ratio, SNR), or spatial resolution.

It is understood that term 'scalable' does not refer to magnitude or scale in terms of numbers, but rather to the ability of the encoding technique to offer a set of different bitstreams corresponding to representations of the original or source signal at different 'scales' of resolutions or other qualities in general. The ITU-T H.264 Annex G specification, which is referred to as Scalable Video Coding (SVC), is an example of a video coding standard that offers video coding scalability in all of temporal, quality, or spatial dimensions. SVC is an extension of the H.264 standard (also known as Advanced Video Coding or AVC). An example of an earlier standard, which also offered all three types of scalability, is ISO MPEG-2 (also published as ITU-T H.262). ITU G.729.1 (also known as G.729EV) is an example of a standard offering scalable audio coding. Scalable video coding techniques which are specifically designed for interactive video communication applications such as videoconferencing are described in commonly assigned International patent application PCT/US06/0288365.

The concept of scalability was introduced in video and audio coding as a solution to distribution problems in streaming and broadcasting, and with a view to allow a given communication system to operate with varying access networks (e.g., clients connected with different bandwidths), network conditions (e.g., bandwidth fluctuation), and client devices (e.g., a personal computer that uses a large monitor vs. a handheld device with a much smaller screen).

Commonly assigned International patent application PCT/US06/028365 describes the design of a new type of server called the Scalable Video Communication Server (SVCS). SVCS can advantageously use scalable coded video for high-quality and low-delay video communication, and has a complexity, which is significantly reduced compared to traditional switching or transcoding Multipoint Control Units (MCUs). Similarly, commonly assigned International patent application PCT/US06/62569 describes a Compositing Scalable Video Coding Server (CSVCS), which has the same benefits as an SVCS but produces a single coded output bit stream. International patent application PCT/US07/80089 describes a Multicast Scalable Video Coding Server (MS-VCS), which has the same benefits as an SVCS but utilizes available multicast communication channels. For convenience in the following description, the three different types of servers (SVCS, CSVCS, and MSVCS) will be commonly referred to as an SVCS, unless otherwise stated.

The scalable video coding design and the SVCS architecture can be used in further advantageous ways, which are described, for example, in commonly assigned International patent applications PCT/US06/028367, PCT/US06/027368, PCT/US06/061815, PCT/US07/062357, and PCT/US07/063335. These applications describe use of scalable coding techniques and SVCS architectures for effective trunking between servers, reduced jitter buffer delay, error resilience and random access, "thinning" of scalable video bitstreams to improve coding efficiency with reduced packet loss, and rate control, respectively. Further, commonly assigned International patent application PCT/US07/65554 describes techniques for transcoding between scalable video coding formats and other formats.

The hierarchical coding process in a typical scalable video coding system follows a pyramidal design. A first base layer is constructed using a baseline encoding technique, suitable for single-layer coding. In the case of SVC, the base layer is encoded using H.264 AVC. Encoding the base layer in this way has the benefit that the lowest scalability layer is backwards compatible with systems that are able to process only non-scalable video. Additional layers (referred to as enhancement layers) are constructed by further encoding of the difference between the original signal and the decoded output of a lower layer. The process is similar to successive approximation of the original signal.

Each additional enhancement layer improves the fidelity of the coded signal in one of three possible fidelity dimensions: temporal, quality (or SNR), or spatial. Temporal enhancement, when added to the base layer, provides a representation of the signal with a higher number of pictures or frames per second (fps). In quality scalability neither the spatial nor the temporal resolution is changed; rather, the residual coding error is further encoded with finer quantization. Since finer quantization will result in a higher SNR, this form of scalability is often referred to as SNR scalability. SNR scalability is further subdivided into Coarse Grain and Fine Grain Scalability (CGS and FGS, respectively). Their difference is that in the latter case, an embedded coding scheme is used to encode the residual coding error, thus allowing improvement of the lower layer SNR even if only a fraction of the enhancement layer is used in the decoding process. The more bits from the FGS layer are available, the better the improvement of the lower layer's SNR. For this reason the technique is also referred to as "progressive refinement." In CGS, the entire enhancement layer normally has to be available during the decoding process. Finally, spatial enhancement provides a representation of the signal at a higher spatial resolution (e.g., CIF vs. QCIF). It is noted that in order to construct the residual coding error, i.e., the difference between the original and the decoded output of the lower layer, the output of the lower layer has to be upsampled to the resolution of the original.

High coding efficiency in video coding is achieved by the utilization of effective models for predicting picture content, coupled with appropriate transformation of the resulting prediction errors (e.g., using the discrete cosine transform or integer approximations), quantization, and entropy coding of the resulting quantization levels and side information produced by the prediction and coding process. A simple mechanism for producing multiple representations of a given video signal would be to create two or more separate encodings of corresponding subsets of the original signal. This technique is typically referred to as simulcasting. Scalable video coding achieves further coding gains compared with simulcasting by using lower layers as prediction references for the encoding of higher layers. This inter-layer prediction exploits the inherent redundancy that exists across the three dimensions of a video signal. In a scalable video encoder, lower layer data is thus made available via additional prediction mode options. These additional options give the encoder more flexibility in its task of minimizing the distortion of the coded video signal while maintaining a given bit budget. At the same time, it is noted that the additional options can make the encoding task more complex as more possibilities may be examined.

An important feature of SVC is that single-loop decoding is used. This is achieved by limiting the encoder to use for inter-layer prediction only lower layer data that are available directly by parsing the bitstream. In other words, a decoder decoding a higher layer does not have to fully decode a lower layer (i.e., reconstruct the actual pixels) but instead needs only to parse the lower layer's bitstream data. This significantly reduces the computational requirements of decoders, and is a significant improvement compared to earlier scalable coding designs such as the one used in MPEG-2.

Even with single-loop decoding, however, the encoder's task in scalable coding is computationally demanding, as for every macroblock (MB) or macroblock partition of every layer it has to arrive at a decision in terms of the prediction mode, motion vector(s), and quantizer setting. The computational demand is even more pronounced in real-time applications such as videoconferencing, where pictures have to be processed within a given amount of time and with very little delay.

Consideration is now being given to improving scalable video coding systems so that computationally efficient encoding can be performed. In particular, attention is being directed to improving coding efficiency by appropriate signaling of prediction modes in the coded video signal.

SUMMARY OF THE INVENTION

Systems and methods for scalable video coding using special inter-layer prediction modes (called telescopic modes) are provided. These modes facilitate accelerated operation of encoders with improved coding efficiency.

A scalable video communication system includes decoders and encoders adapted or configured for telescoping mode operation. The decoders receive a scalable digital video bitstream having groups of coded units of enhancement target layer and other layers. The digital video bitstream contains control data (including prediction control data) associated with a group of coded units and control (including prediction), texture, or motion data associated with individual coded units. The decoder decodes the control data associated with a group of coded units of the target layer and the at least one additional layer, and control, texture, or motion data associated with individual coded units of the target layer and the at least one additional layer. A predictor coupled to the decoder generates prediction references for the control, texture, or motion data of a plurality of coded units of the target layer as signaled by prediction control data associated with a group of coded units of the target layer or the at least one additional layer, or from prediction control data associated with individual coded units of the target layer or the at least one additional layer. A combiner combines the generated prediction references with the corresponding decoded control, texture, or motion data associated with the plurality of coded units of the target layer to produce portions of a decoded picture corresponding to the plurality of coded units of the target layer.

The prediction control data associated with the groups of coded units of the target layer or the at least one additional layer and the prediction control data associated with individual coded units of the target layer or the at least one additional layer include inter-layer prediction control data. The predictor is configured to use values indicated by the inter-layer prediction control data associated with a group of coded units of the target layer when the corresponding inter-layer prediction control data associated with individual coded units of the group of coded units of the target layer are not present in the digital video bitstream.

The coder receives digital video input pictures for transmission. An optional down sampler may generate a downsampled picture of an input picture at a lower resolution. A first prediction estimator coupled to either the optionally operated downsampler or the input and a first combiner that provides a plurality of previously decoded base layer pictures to be used as reference pictures, generates a first set of control (including prediction) and motion data prediction references associated with a plurality of the coded units of the (optionally downsampled) picture, or control data (including prediction control data) associated with a group of coded units of the (optionally downsampled) picture, and generated the portions of a first prediction reference picture that correspond to the coded units.

A first comparer coupled to the first prediction estimator and the optional downsampler or input, computes the difference between the (optionally downsampled) input picture and the portions of a first prediction reference picture, and generates a second set of control (including prediction) and texture data associated with a plurality of the coded units of the (optionally downsampled) input picture, and control (including prediction) data associated with a group of coded units of the (optionally downsampled) input picture. A first combiner coupled to the first comparer and the first prediction estimator combines the second set of generated control (including prediction) and texture data with their corresponding portions of the first prediction reference picture to generate the corresponding portions of a new base layer decoded picture.

A second prediction estimator coupled to the input and a second combiner that provides a plurality of previously decoded enhancement layer pictures to be used as reference pictures, generates a third set of control (including prediction) and motion data prediction references associated with a plurality of the coded units of the input picture, or control data (including prediction control data) associated with a group of coded units of the input picture, and generates the portions of a second prediction reference picture that correspond to the coded units.

A second comparer coupled to the second prediction estimator and the input, computes the difference between the input picture and the second prediction reference picture, and generates a fourth set of control (including prediction) and texture data associated with a plurality of the coded units of the input picture, and control (including prediction) data associated with a group of coded units of the input picture.

A second combiner coupled to the second comparer and the second prediction estimator combines the fourth set of generated control (including prediction) and texture data with their corresponding portions of the second prediction reference picture to generate the corresponding portions of a new enhancement layer decoded picture.

The encoder encodes the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplexes the data into a single output bit stream.

The third and fourth sets of control data include inter-layer prediction control data. The second prediction estimator and the second comparer set inter-layer prediction control data values in one or more groups of coded units of the input picture such that corresponding inter-layer prediction control data values in the coded units of the input picture associated with the one or more groups of coded units of the input picture are not transmitted.

BRIEF DESCRIPTION OF THE DRAWINGS

FIG. 1 is a schematic illustration of an exemplary architecture of a scalable video communication system. The system may have a design similar to conventional systems, but its components are further configured to accommodate telescopic mode operation, in accordance with the principles of the present invention.

FIG. 2 is a schematic illustration of the conventional structure of an AVC single-layer video encoder. The system may have a block design similar to conventional systems, but which are further configured to accommodate telescopic mode operation, in accordance with the principles of the present invention.

FIG. 3 is a schematic illustration of the structure of an AVC single-layer video decoder. The system may have a block design similar to conventional systems, but which are further configured to accommodate telescopic mode operation, in accordance with the principles of the present invention.

FIG. 4 is a schematic illustration of the structure of a conventional SVC scalable video encoder with three quality scalability layers. The system may have a block design similar to conventional systems, but which is further configured to accommodate telescopic mode operation, in accordance with the principles of the present invention.

FIG. 5 is a schematic illustration of the structure of a conventional SVC scalable video encoder with three spatial scalability layers;

FIG. 6 is an illustration of exemplary syntax and semantics modifications for using the adaptive_prediction_flag in the SVC JD7 codec, in accordance with the principles of the present invention; and FIG. 7 is an illustration of exemplary syntax and semantics modifications for providing complete telescopic mode flag support in the SVC JD8 codec, in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

Systems and methods for scalable video coding using special inter-layer prediction modes (called telescopic modes) are provided.

FIG. 1 shows an exemplary architecture of a video communication system 100 which uses scalable coding. Communication system 100 includes a scalable video encoder 110, which communicates, over a communications network 120, with a scalable video decoder 130. In a preferred embodiment of communication system 100, the H.264 SVC coding format ('SVC') is used for video communication. (See, e.g., the SVC JD7 specification, T. Wiegand, G. Sullivan, J. Reichel, H. Schwarz, M. Wien, eds., "Joint Draft 7: Scalable Video Coding," Joint Video Team, Doc. JVT-T201, Klagenfurt, July 2006, which is incorporated by reference herein in its entirety). SVC is the scalable video coding extension (Annex G) of the H.264 video coding standard ('AVC').

An SVC coded bitstream can be structured into several components or layers. A base layer offers a representation of the source signal at some basic fidelity. Additional layers (enhancement layers) provide information for improved representation of the signal in additional scalability dimensions (e.g., temporal, quality, or spatial). The layers of the coded bitstream are typically formed in a pyramidal structure, in which the decoding of a layer may require the presence of one or more lower layers.

It is noted that the AVC standard already supports temporal scalability through its use of reference picture lists and associated reference picture list reordering (or MMCO) commands. The lowest layer of an SVC stream is compliant with the AVC specification by design.

With continued reference to FIG. 1, the output of the Scalable Video Encoder contains two layers, Layer 0 and Layer 1, where Layer 0 is the base layer and Layer 1 is an enhancement layer. While FIG. 1 shows only two exemplary layers for simplicity, it will be understood that the present invention is applicable to situations with any number of spatial or quality enhancement layers without limitation. Similarly, while FIG. 1 shows the two layers as being transported as separate streams over a single communications network 120, it will be understood that the streams corresponding to the two (or more) layers may be transported over any number of actual network connections in various possible configurations. The possible configurations may, for example, include one in which all streams are multiplexed together for transport, and another in which more than the actual number of spatial or quality layers are transported when further demultiplexing of data takes place (e.g., when data partitioning is used, or when data is demultiplexed based on its underlying temporal layering).

FIG. 2 shows the design or architecture of an AVC single-layer video encoder 200 including blocks 202-218. The design shown is typical of block-based hybrid coding with motion compensation, which includes essentially all standard video codecs, although in an AVC encoder each block has considerably more operating options. The coded bitstream consists of multiplexed texture data (quantized transform coefficients), motion data, and control data that are entropy coded for high coding efficiency. The texture data is the quantized residual prediction error that results after motion compensated or intra prediction is used, whereas the motion data is the data necessary to perform motion-compensated prediction (motion vector differences, etc.). As with any predictive coding scheme, the encoder contains a decoder in its prediction loop. In FIG. 2, the decoder components of encoder 200 (i.e., blocks 206-214) are placed in decoder subunit 200A.

FIG. 3 shows the design or architecture of a stand-alone AVC decoder 300. The design of AVC decoder 300 is identical to the decoder subunit 200A shown in FIG. 2, with the only difference being the further inclusion of an entropy decoder/demultiplexer 310 (which is not necessary in an encoder). It is noted that positions of blocks 206-214 of decoder subunit 200A shown in FIG. 3 have been rearranged for improved readability.

The key operating units that determine an encoder's efficiency and complexity are its Coder Control and Motion Estimation units (e.g., Coder Control unit 202 and Motion Estimation unit 216, FIG. 2). The Coder Control unit is responsible for deciding appropriate modes of operation in order to maximize quality (or equivalently, minimize coding distortion) for a given bit rate. The Motion Estimation unit works in conjunction with the Coder Control unit, in that latter affects the estimation process of the former. Motion estimation is the most computationally intensive operation in video encoding, especially in modern codecs with quarter pel support.

A scalable video codec can be constructed using a single-layer codec as the basic using a pyramidal structure. Scalable video coding techniques, which are specifically designed for interactive video communication applications such as video-conferencing, are described in commonly assigned International patent application PCT/US06/028365. In a preferred embodiment of the present invention, where SVC is used as the scalable video codec, the enhancement layers are similarly built on top of an AVC base layer.

FIG. 4 schematically shows the exemplary structure of a conventional SVC encoder 400 for quality scalability with three quality layers. In SVC encoder 400, the lowest layer is compliant with AVC (by design). The encoding process for the enhancement layers may use lower layer data for inter-layer prediction, which is indicated in the figure by vertical arrows labeled "Inter-layer prediction". The type of data that can be used for inter-layer prediction, in accordance with the single-loop design principle of SVC, are intra, motion, and residual data. The resultant enhancement layer texture and motion data are coded similarly to the base (AVC) layer. While FIG. 4 shows the different layer data as multiplexed together in a single output bitstream, the different layer bitstreams may be transmitted on any number of channels (including a number higher than the number of layers if, e.g., data partitioning is used, or if layers also contain temporal scalability components).

FIG. 5 schematically shows the exemplary structure of a SVC encoder 500 for spatial scalability with three spatial layers. SVC encoder 500 for spatial scalability differs from SVC encoder 400 for quality scalability only in The only difference with FIG. 4 is that the input in the former is downsampled for constructing the two lower spatial layers. Again, the lowest layer is compliant with AVC, and the inter-layer prediction process can use intra, motion, and residual data from lower layers, properly scaled or upsampled for the target resolution of the referencing layer. The decoders for quality and spatial scalability corresponding to encoders 400 and 500 shown in FIG. 4 and FIG. 5, respectively, are essentially the same as decoder 300 shown in FIG. 3, except for the added inter-layer prediction modes available, and the use of upsampling/scaling for texture/motion data in spatial scalability.

A key engineering design problem in both single-layer and scalable video encoders such as encoders 400 and 500 is the computational complexity versus compression efficiency tradeoff. In all video coding standards, the standard specification only specifies the structure of the bitstream and the decoding process; the encoding procedure is left unspecified. Further, the video coding standards do not provide any guidance for effective encoding strategies in encoder design.

The inventive systems and methods described herein are directed toward facilitating accelerated operation of a scalable video encoder, with appropriate signaling to the decoder, and with improved coding efficiency.

A video encoder (single-layer or scalable) must make several decisions while coding picture data. For every macroblock (MB), the encoder must make decisions regarding intra/inter coding, prediction mode selection, motion mode and vector selection, quantizer selection, etc. In the absence of other constraining factors, the objective of an encoder is to make these decisions so as to minimize the distortion of the coded signal while keeping the output bit rate within given constraints. This process is called Rate-Distortion Optimization (RDO) in recognition that the encoder seeks to minimize distortion for a given rate. The dimension of the optimization problem is, however, extremely large. Typically fast, suboptimal algorithms and heuristics are used in the design of effective encoders. It is noted that, in real video coding systems, perceptual factors may dictate decisions in the encoder that, in fact, increase the quantitative distortion, as expressed in terms of Peak Signal-to-Noise Ratio (PSNR), in order to obtain results that are more pleasing to human observers. These decisions are typically application specific. For example, different configurations may be used for two encoders tuned for broadcast and videoconferencing applications, respectively, as both the subject matter and the operating bit rates of the two encoders are very different.

The encoding process can be represented by a decision tree, which the encoder has to traverse in order to make final coding decisions for a particular MB, picture, or group of pictures. For scalable video coding, in particular, the size of this tree is significantly larger than that of a single layer encoder, since decisions have to be made not just for the base layer (equivalent to a single-layer encoder), but also for each of the enhancement layers present. The computational demands are thus considerable, and it is important to provide ways through which an encoder that may not have enough computational resources to fully consider all coding choices, can derive a suitable simplified coding strategy. The implementation of a suitable coding strategy is particularly important for real-time, conversational services where both real-time and low-delay operation may be required. A suitable simplified coding strategy, for example, in the case of a live broadcast encoder may recognize that the encoder has to operate in real-time, but its delay requirements are much more relaxed. Equally important for implementation, the encoder must be able to signal the result of this simplified coding strategy to the decoder, without adversely affecting coding performance.

Computational demands have typically not been considered as a crucial design factor in the development of coding standards, and the development of such codecs is performed using simulation software that is allowed to run as long as necessary in order to obtain optimized coding efficiency results (e.g., one hour or more per picture). As a result, conventional design of the bitstream according to the standards does not cater to the needs of accelerated encoder decision-making, in that the signaling of a simplified coding strategy may incur substantial bit rate overhead.

A specific type of accelerated decision-making for scalable video coding, according to the present invention, is a technique referred to herein as 'telescopic' operation. With this technique, accelerated encoder operation is achieved by forgoing full optimization of coding decisions for an enhancement layer, and using instead the decisions that were made in the base layer. While further refinement of such decisions is likely to achieve improved coding efficiency, they may already represent a very good computational complexity vs. coding efficiency tradeoff. The technique is particularly effective for videoconferencing material, where scene activity is generally low.

The codec in SVC JD7 is an extension of the AVC design (ITU-T Rec. H.264|ISO/IEC 14496-10 version 4, "Advanced video coding for generic audiovisual services," 2005, incorporated herein by reference in its entirety, and referred to as the 'AVC specification'). The text of the AVC specification is in fact an integral part of the text of SVC JD7, as the SVC extension forms a new Annex G of the AVC specification. As mentioned earlier, the base layer in an SVC bitstream is an AVC-compliant bitstream by design. Sections 7.3.3 (Slice header syntax), 7.3.4 (Slice data syntax), and 7.3.5 (Macroblock layer syntax) of the AVC specification, including their subsections, define the detailed syntax of the coded picture data. The slice header (Section 7.3.3) includes parameters that affect the entire slice, such as an indicator of the address of the first macroblock in the slice (first_mb_in_slice), the slice type (I, P, B, SI, or SP), quantizer setting that affects all macroblocks in the slice (slice_qp_delta), as well as deblocking filter settings, weighting tables, and reference picture list reordering commands. The slice data (Section 7.3.4) syntax enable, among other things, skipping a number of initial macroblocks from the current slice. The actual macroblock data are described in Section 7.3.5. The data includes the macroblock type (mb_type) which defines the prediction mode used for the current macroblock, the coded block pattern which signals which of the various chroma and luma blocks corresponding to the current macroblock have non-zero transform coefficients, as well as quantizer settings effective starting at the current macroblock (mb_qp_delta).

The macroblock type is a crucial parameter, as it signals which of the many prediction modes the encoder chose to encode the current macroblock. SVC JD7 Tables 7.11 through 7.14 summarize the available macroblock types in AVC. For example, for a P slice (Table 7.13), mode corresponds to prediction mode 'P_L0_L016×8', in which the 16×16 macroblock is split into two 16×8 regions, and two motion vectors are used to predict each part from a reference picture contained in the first reference picture list (L0). The actual motion vector data (mvd_l0, coded as a difference) are shown in Section 7.3.5.1, and include an optional index to the reference picture used (ref_idx_l0) if it is not the default. The result of the prediction process is the residual data, represented by the syntax described in Section 7.3.5.3 and associated subsections.

The corresponding structures for enhancement layers in the SVC JD7 specification are defined in Sections G.7.3.3 through G.7.3.7. The structures are similar to the ones used in AVC, but with additional data that address the increased options present in SVC. In general, their design is such that data that is present in lower layers are made available for the coding of the current layer. In other words, coded bitstream parameters can be reused in higher layers by directly referencing them, instead of coding them anew (inter-layer prediction). For single-loop decoding, this excludes data that can only be obtained by full decoding, as they would necessitate the availability of complete decoding loops for layers lower than the current one, leading to multi-loop designs.

Of particular importance is the slice header parameter base_id_plus1 (Section G.7.3.4), which identifies the reference layer for the current layer when using inter-layer prediction. It is noted that the parameter base_id_plus1 does not refer to the base layer of the entire bitstream, but only to the particular layer that is used as the basis or reference for predicting the current layer. The parameter jointly encodes the coordinates of the reference layer in terms of the spatial scalability layer, quality scalability layer, and fragment order (when FGS or progressive refinement slices are used). If the value of base_id_plus1 is zero, then no inter-layer prediction is used (e.g., in the lowest layer).

When inter-layer prediction is used (i.e., when base_layer_id_plus1 is not zero), the parameter adaptive_prediction_ flag is present in the bitstream (Section G.7.3.4). The adaptive prediction flag affects how inter-layer prediction is used in the macroblock layer by controlling the presence and value of the parameter base_mode_flag (Section G.7.3.6). When base_mode_flag is set, then the macroblock type, reference indices, and motion vectors, where applicable, are inferred from the corresponding reference (base) layer macroblock.

The presence of the base_mode_flag for each macroblock of a slice is controlled at the slice level by the adaptive_prediction_flag. When the adaptive_prediction_flag is not set, then the base mode flags do not have to be sent. The value one (set) is inferred for base_mode_flag, thus forcing all macroblocks (within the crop window, i.e., when corresponding lower layer data are present in the base layer) to use the base layer mode and motion information. Hence by setting the adaptive_prediction_flag to zero, a slice-wide telescopic mode prediction in which the base layer decisions and data are reused in the enhancement layer can be achieved. The elimination of the base mode flags also results in a saving of approximately 12 Kbps for a CIF sequence at 30 fps using CAVLC entropy coding.

A significant drawback, however, of the SVC JD7 design is that when adaptive_prediction_flag is not set, then the residual_prediction_flag is inferred to be set slice-wide for every macroblock, as seen in Section G.7.3.6.3. The residual_prediction_flag, relevant for non-intra macroblocks, indicates that the enhancement residual signal is predicted from the (possibly upsampled) reconstructed residual signal of the base macroblock (or sub-macroblock). Forcing residual prediction to be always used whenever adaptive prediction is not used, however, decreases coding efficiency. Similarly, the alternative of forcing residual prediction to be always off whenever adaptive prediction is not used, again lowers the quality for a given bit rate.

Extensive experimental results using standard test sequences indicate that, in all cases, the rate-distortion curves when setting residual prediction on a macroblock basis are always higher than the corresponding curves when setting residual prediction to be always on or always off. Equivalently, for a given bit rate and when not using adaptive prediction (adaptive_prediction_flag set to zero), being able to adaptively use residual prediction results in higher PSNR compared with the cases when residual prediction is either always on or always off.

The experimental results show that to enable an encoder to use and efficiently signal telescopic mode decisions to a decoder, the various prediction modalities must be a) signaled at the slice header for slice-wide use, and b) signaled by separate flags so that coupling of the different modalities is eliminated. Signaling mode decisions at the slice level allows the elimination of the corresponding signaling at the macroblock or macroblock partition level, which results in increased compression efficiency.

In an exemplary embodiment of the present invention, where SVC JD7 is used, the slice header may be augmented by a new flag, adaptive_residual_prediction_flag. When this flag is not set (i.e., set to zero), then a default value for the residual_prediction_flag is assumed for every macroblock of the slice. The default value for residual_prediction_flag in an exemplary implementation of the present invention is set to one.

FIG. 6 shows exemplary syntax and semantics 600 in a preferred embodiment of the invention as applied to the SVC JD7 codec. A close examination of the SVC JD7 specification also reveals that the motion-related inter-layer prediction flags, motion_prediction_flag_l0 and motion_prediction_flag_l1 (Sections G.7.3.6.1 and G.7.3.6.2) are also possible targets for accelerated encoder operation. These flags indicate (when set to 1) that the (possibly scaled) base motion vector(s) is used as motion vector predictor(s) for the list 0 (or list 1, respectively) motion vector(s) of the macroblock (or macroblock partition) to which they belong. Similarly, for the residual_prediction_flag, which refers to texture prediction, it is advantageous to allow inter-layer motion prediction to be set at the slice level for all macroblocks or macroblock partitions of the slice.

In order to provide more flexibility for an encoder to turn inter-layer prediction flags on or off for all macroblocks or macroblock partitions in a slice, it is advantageous to also encode at the slice level the default value that should be used when the corresponding flag is not set adaptively in each macroblock or macroblock partition. Such encoding at the slice level can be applied to both the base_mode_flag and the motion_prediction_flag. When the default base_mode_flag is set to one, however, the motion_prediction_flag is useless and does not have to be transmitted. The combination of these flags provides full telescopic mode support to the encoder and decoder.

FIG. 7 shows exemplary syntax and semantics 700 for a preferred embodiment of the invention as applied in the case where complete telescopic mode support is added to the SVC JD8 codec (see T. Wiegand, G. Sullivan, J. Reichel, H. Schwarz, M. Wien, eds., "Joint Draft 8: Scalable Video Coding," Joint Video Team, Doc. JVT-U201, Hangzhou, October 2006, which is incorporated by reference herein in its entirety). The primary difference between SVC JD8 and JD7, for the purposes of this invention, is that in JD8 the NAL unit header flag layer_base_flag specifies (when set to one) that no inter-layer prediction (of coding mode, motion, sample value, and/or residual prediction) is used for the current slice, and that the parameter base_id_plus1 is renamed base_id.

As an example, in order to signal to a decoder that an enhancement layer is coded by using only base layer information, the adaptive_prediction_flag should be set to 0, the default_base_mode_flag should be set to 1, and the adaptive_residual_prediction_flag should be set to 0. The flags adaptive_motion_prediction_flag and default_motion_prediction_flag are not used, and are not coded. The macroblocks of an enhancement layer slice (using the SVC JD8 specification) will only contain coded_block_pattern data indicating that no non-zero coefficients are present in any of their corresponding luma or chroma blocks. The need to transmit the coded_block_pattern data may be eliminated by introducing an additional flag at the slice header, indicating that no macroblock data will be transmitted for the current slice, and that the above telescopic mode flag configuration is to be used.

Although the inventive techniques were described herein in the context of the SVC video coding standard, the principles of the present invention can be applied to any scalable video coding scheme that uses inter-layer prediction. Additionally, the inventive techniques may be applied to any coded unit of a video bitstreams, such as a picture or a group of pictures, and not exclusively the slice level. Similarly, the technique is applicable when the smallest coded unit for which prediction modes are signaled is different than a macroblock (e.g., a block or any other structure, even of arbitrary shape, that comprises a coded unit).

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It will be understood that in accordance with the present invention, the techniques described herein may be implemented using any suitable combination of hardware and software. The software (i.e., instructions) for implementing and operating the aforementioned rate estimation and control techniques can be provided on computer-readable media, which can include, without limitation, firmware, memory, storage devices, microcontrollers, microprocessors, integrated circuits, ASICs, on-line downloadable media, and other available media.

The invention claimed is:

1. A system for decoding of scalable digital video, the system comprising:

an input configured to receive a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;

a decoder coupled to the input, wherein the decoder is configured to decode the control data associated with a group of coded units of the target layer and the at least one additional layer, and control, texture, or motion data associated with individual coded units of the target layer and the at least one additional layer;

a predictor coupled to the decoder, wherein the decoder is configured to generate prediction references for the control, texture, or motion data of a plurality of coded units of the target layer as signaled prediction control data associated with a group of coded units of the target layer or the at least one additional layer, or from prediction control data associated with individual coded units of the target layer or the at least one additional layer; and a combiner coupled to the predictor, wherein the combiner is configured to combine the generated prediction references with the corresponding decoded control, texture, or motion data associated with the plurality of coded units of the target layer to produce portions of a decoded picture corresponding to the plurality of coded units of the target layer, wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream.

2. The system of claim 1, wherein a received digital video bitstream conforms to the SVC JD8 specification, wherein coded units correspond to macroblocks or macroblock partitions and groups of coded units correspond to slices, extended such that:

the inter-layer prediction control data associated with a macroblock or macroblock partition comprise a residual_prediction_flag parameter; and the inter-layer prediction control data associated with a slice comprise an adaptive_residual_prediction_flag parameter, wherein the decoder is further configured not to decode the residual_prediction_flag parameter in macroblock or macroblock partitions of a slice for which the adaptive_residual_prediction_flag parameter is not set, and wherein the predictor is further configured to assume a default value for the residual_prediction_flag parameter for all macroblocks or macroblock partitions of the slice.

3. The system of claim 1, wherein a received digital video bitstream conforms to the SVC JD8 specification, wherein coded units correspond to macroblocks or macroblock partitions and groups of coded units correspond to slices, extended such that:

the inter-layer prediction control data associated with a macroblock or macroblock partition comprise a base_mode_flag parameter;

the inter-layer prediction control data associated with a slice comprise an adaptive_prediction_flag parameter and a default_base_mode_flag parameter, wherein the decoder is further configured not to decode the base_mode_flag parameter in macroblock or macrobock partitions of a slice for which the adaptive_prediction_flag parameter is not set, and wherein the predictor is further configured to assume a value indicated by the default_base_mode_flag parameter for the base_mode_flag parameter for all macroblocks or macroblock partitions of the slice.

4. The system of claim 1, wherein a received digital video bitstream conforms to the SVC JD8 specification, wherein coded units correspond to macroblocks or macroblock partitions and groups of coded units correspond to slices, extended such that:

the inter-layer prediction control data associated with a macroblock or macroblock partition comprise a motion_prediction_flag_l0 parameter and a motion_prediction_flag_l1 parameter; and the inter-layer prediction control data associated with a slice comprise an adaptive_motion_prediction_flag parameter and a default_motion_prediction_flag parameter, wherein the decoding means is further configured not to decode the motion_prediction_flag_l0 or motion_prediction_flag_l1 parameters in macroblock or macrobock partitions of a slice for which the adaptive_motion_prediction_flag parameter is not set, and wherein the predictor is further configured to assume a value indicated by the default_motion_prediction_flag parameter for the motion_prediction_flag_l0 and motion_prediction_flag_l1 parameters for all macroblocks or macroblock partitions of the slice.

5. A system for scalable coding of digital video, the system comprising:

an input configured to receive digital video input pictures;

an optionally operated downsampler coupled to the input, wherein the down sampler is configured to generate a downsampled picture of an input picture at a lower resolution;

a first prediction estimator coupled to either the optional downsampler or the input and a first combiner that provides a plurality of previously decoded base layer pictures to be used as reference pictures, wherein the first prediction estimator is configured to generate a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;

a first comparer coupled to the first prediction estimator and the optional downsampler or input, wherein the first comparer is configured to compute the difference between the (optionally downsampled) input picture and the portions of a first prediction reference picture, and generate a second set of control (including prediction) and texture data associated with a plurality of the coded units of the (optionally downsampled) input picture, and control (including prediction) data associated with a group of coded units of the (optionally downsampled) input picture, a first combiner coupled to the first comparer and the first prediction estimator wherein the first combiner is configured to combine the second set of generated control (including prediction) and texture data with their corresponding portions of the first prediction reference picture to generate the corresponding portions of a new base layer decoded picture;

a second prediction estimator coupled to the input and a second combiner that provides a plurality of previously decoded enhancement layer pictures to be used as reference pictures, wherein the second prediction estimator is configured to generate a third set of control (including prediction) and motion data prediction references associated with a plurality of the coded units of the input picture, or control data (including prediction control data) associated with a group of coded units of the input picture, and also generating the portions of a second prediction reference picture that correspond to the coded units;

a second comparer coupled to the second prediction estimator and the input, wherein the second comparer is configured to compute the difference between the input picture and the second prediction reference picture, and generate a fourth set of control (including prediction) and texture data associated with a plurality of the coded units of the input picture, as well as control (including prediction) data associated with a group of coded units of the input picture, a second combiner coupled to the second comparer and the second prediction estimator, wherein the second combiner is configured to combine the fourth set of generated control (including prediction) and texture data with their corresponding portions of the second prediction reference picture to generate the corresponding portions of a new enhancement layer decoded picture; and an encoder configured to encode the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplex the data into a single output bit stream, wherein the third and fourth sets of control data include inter-layer prediction control data, and wherein the second prediction estimator and the second comparer are further configured to set inter-layer prediction control data values in one or more groups of coded units of the input picture such that corresponding inter-layer prediction control data values in the coded units of the input picture associated with the one or more groups of coded units of the input picture are not transmitted.

6. The system of claim 5, wherein the first and second prediction estimators, the first and second comparers, and the encoder are configured to produce and output bit stream conforming to the SVC JD 8 specification, wherein coded units correspond to macroblocks or macroblock partitions and groups of coded units correspond to slices, extended such that:

the inter-layer prediction control data associated with a macroblock or macroblock partition comprise a residual_prediction_flag parameter;

the inter-layer prediction control data associated with a slice comprise an adaptive_residual_prediction_flag parameter, wherein the second prediction estimator and the second comparer are configured to set the adaptive_prediction_flag parameter to false in one or more slices, the encoder is further configured to not include the residual_prediction_flag in its encoding of the macroblocks or macroblock partitions associated with the one or more slices, and the second predictor and second comparer are further configured to assume a default value for the residual_prediction_flag parameter for all macroblocks or macroblock partitions of the one or more slices.

7. The system of claim 5, wherein the first and second prediction estimator, the first and second comparer, and the encoder are configured to produce and output bit stream conforming to the SVC JD 8 specification, wherein coded units correspond to macroblocks or macroblock partitions an groups of coded units correspond to slices, extended such that:

the inter-layer prediction control data associated with a macroblock or macroblock partition comprise a base_mode_flag parameter;

the inter-layer prediction control data associated with a slice comprise an adaptive_prediction_flag parameter and a default_base_mode_flag parameter, wherein the second prediction estimator and the second comparer are configured to set the adaptive_prediction_flag parameter to false in one or more slices, the encoder is further configured to not include the base_mode_flag in its encoding of the macroblocks or macroblock partitions associated with the one or more slices, and where the second predictor and the second comparer are further configured to assume a value indicated by the default_base_mode_flag for the base_mode_flag parameter of all macroblocks or macroblock partitions of the one or more slices.

8. The system of claim 5, wherein the first and second prediction estimator, the first and second comparers, and the encoder are configured to produce and output bit stream conforming to the SVC JD 8 specification, wherein coded units correspond to macroblocks or macroblock partitions and groups of coded units correspond to slices, extended such that:

the inter-layer prediction control data associated with a macroblock or macroblock partition comprise a motion_prediction_flag_l0 parameter and a motion_prediction_flag_l1 parameter;

the inter-layer prediction control data associated with a slice comprise an adaptive_motion_prediction_flag parameter and a default_motion_prediction_flag parameter, wherein the second predictor and the second comparer are configured to set the adaptive_motion_prediction_flag parameter to false in one or more slices, the encoder is further configured to not include the motion_prediction_flag_l0 or motion_prediction_flag_l1 parameters in its encoding of the macroblocks or macroblock partitions associated with the one or more slices, and where the second predictor and the second comparer are further configured to assume a value indicated by the default_motion_prediction_flag for the motion_prediction_flag_l0 and motion_prediction_flag_l1 parameters of all macroblocks or macroblock partitions of the one or more slices.

9. A scalable video communication system comprising:

a decoding system for decoding of scalable digital video, the system comprising:

an input configured to receive a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;

a decoder coupled to the input, wherein the decoder is configured to decode the control data associated with a group of coded units of the target layer and the at least one additional layer, and control, texture, or motion data associated with individual coded units of the target layer and the at least one additional layer;

a predictor coupled to the decoder, wherein the decoder is configured to generate prediction references for the control, texture, or motion data of a plurality of coded units of the target layer as signaled prediction control data associated with a group of coded units of the target layer or the at least one additional layer, or from prediction control data associated with individual coded units of the target layer or the at least one additional layer; and a combiner coupled to the predictor, wherein the combiner is configured to combine the generated prediction references with the corresponding decoded control, texture, or motion data associated with the plurality of coded units of the target layer to produce portions of a decoded picture corresponding to the plurality of coded units of the target layer, wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream;

an encoding system for scalable coding of digital video, the system comprising:

an input configured to receive digital video input pictures;

an optionally operated downsampler coupled to the input, wherein the down sampler is configured to generate a downsampled picture of an input picture at a lower resolution;

a first prediction estimator coupled to either the optional downsampler or the input and a first combiner that provides a plurality of previously decoded base layer pictures to be used as reference pictures, wherein the first prediction estimator is configured to generate a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;

a first comparer coupled to the first prediction estimator and the optional downsampler or input, wherein the first comparer is configured to compute the difference between the (optionally downsampled) input picture and the portions of a first prediction reference picture, and generate a second set of control (including prediction) and texture data associated with a plurality of the coded units of the (optionally downsampled) input picture, and control (including prediction) data associated with a group of coded units of the (optionally downsampled) input picture, a first combiner coupled to the first comparer and the first prediction estimator wherein the first combiner is configured to combine the second set of generated control (including prediction) and texture data with their corresponding portions of the first prediction reference picture to generate the corresponding portions of a new base layer decoded picture;

a second prediction estimator coupled to the input and a second combiner that provides a plurality of previously decoded enhancement layer pictures to be used as reference pictures, wherein the second prediction estimator is configured to generate a third set of control (including prediction) and motion data prediction references associated with a plurality of the coded units of the input picture, or control data (including prediction control data) associated with a group of coded units of the input picture, and also generating the portions of a second prediction reference picture that correspond to the coded units;

a second comparer coupled to the second prediction estimator and the input, wherein the second comparer is configured to compute the difference between the input picture and the second prediction reference picture, and generate a fourth set of control (including prediction) and texture data associated with a plurality of the coded units of the input picture, as well as control (including prediction) data associated with a group of coded units of the input picture, a second combiner coupled to the second comparer and the second prediction estimator, wherein the second combiner is configured to combine the fourth set of generated control (including prediction) and texture data with their corresponding portions of the second prediction reference picture to generate the corresponding portions of a new enhancement layer decoded picture; and an encoder configured to encode the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplex the data into a single output bit stream, wherein the third and fourth sets of control data include inter-layer prediction control data, and wherein the second prediction estimator and the second comparer are further configured to set inter-layer prediction control data values in one or more groups of coded units of the input picture such that corresponding inter-layer prediction control data values in the coded units of the input picture associated with the one or more groups of coded units of the input picture are not transmitted; and a communication network connecting the output of the encoding system to the input of the decoding system, wherein the second prediction estimator and the second comparer of the encoding system are further configured to use telescopic inter-layer prediction control data values in more or less groups of coded units of the input picture, depending on the bit rate available in the communication network.

10. A scalable video communication system comprising:

a communication network;

a decoding system for decoding of scalable digital video, the system comprising:

an input configured to receive a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;

a decoder coupled to the input, wherein the decoder is configured to decode the control data associated with a group of coded units of the target layer and the at least one additional layer, and control, texture, or motion data associated with individual coded units of the target layer and the at least one additional layer;

a predictor coupled to the decoder, wherein the decoder is configured to generate prediction references for the control, texture, or motion data of a plurality of coded units of the target layer as signaled prediction control data associated with a group of coded units of the target layer or the at least one additional layer, or from prediction control data associated with individual coded units of the target layer or the at least one additional layer; and a combiner coupled to the predictor, wherein the combiner is configured to combine the generated prediction references with the corresponding decoded control, texture, or motion data associated with the plurality of coded units of the target layer to produce portions of a decoded picture corresponding to the plurality of coded units of the target layer, wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream;

an encoding system for scalable coding of digital video, the system comprising:
  an input configured to receive digital video input pictures;
  an optionally operated downsampler coupled to the input, wherein the down sampler is configured to generate a downsampled picture of an input picture at a lower resolution;
  a first prediction estimator coupled to either the optional downsampler or the input and a first combiner that provides a plurality of previously decoded base layer pictures to be used as reference pictures, wherein the first prediction estimator is configured to generate a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;
  a first comparer coupled to the first prediction estimator and the optional downsampler or input, wherein the first comparer is configured to compute the difference between the (optionally downsampled) input picture and the portions of a first prediction reference picture, and generate a second set of control (including prediction) and texture data associated with a plurality of the coded units of the (optionally downsampled) input picture, and control (including prediction) data associated with a group of coded units of the (optionally downsampled) input picture,
  a first combiner coupled to the first comparer and the first prediction estimator wherein the first combiner is configured to combine the second set of generated control (including prediction) and texture data with their corresponding portions of the first prediction reference picture to generate the corresponding portions of a new base layer decoded picture;
  a second prediction estimator coupled to the input and a second combiner that provides a plurality of previously decoded enhancement layer pictures to be used as reference pictures, wherein the second prediction estimator is configured to generate a third set of control (including prediction) and motion data prediction references associated with a plurality of the coded units of the input picture, or control data (including prediction control data) associated with a group of coded units of the input picture, and also generating the portions of a second prediction reference picture that correspond to the coded units;
  a second comparer coupled to the second prediction estimator and the input, wherein the second comparer is configured to compute the difference between the input picture and the second prediction reference picture, and generate a fourth set of control (including prediction) and texture data associated with a plurality of the coded units of the input picture, as well as control (including prediction) data associated with a group of coded units of the input picture,
  a second combiner coupled to the second comparer and the second prediction estimator, wherein the second combiner is configured to combine the fourth set of generated control (including prediction) and texture data with their corresponding portions of the second prediction reference picture to generate the corresponding portions of a new enhancement layer decoded picture; and
  an encoder configured to encode the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplex the data into a single output bit stream,
wherein the third and fourth sets of control data include inter-layer prediction control data, and wherein the second prediction estimator and the second comparer are further configured to set inter-layer prediction control data values in one or more groups of coded units of the input picture such that corresponding inter-layer prediction control data values in the coded units of the input picture associated with the one or more groups of coded units of the input picture are not transmitted; and
  a Scalable Video Communication Server ("SVCS") connected to the encoding system and the decoding system over the communication network,
wherein the SVCS is configured to replace one or more enhancement layer slices received by the encoding system with slices that only signal telescopic inter-layer prediction and do not contain macroblock texture or motion data, prior to forwarding them to the decoding system.

11. A method for decoding of scalable digital video, the method comprising:
  at an input, receiving a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;
  at a decoder, decoding the received input by decoding the control data associated with a group of coded units of the target layer and the at least one additional layer, and control, texture, or motion data associated with individual coded units of the target layer and the at least one additional layer;
  using a predictor coupled to the decoder, to generate prediction references for the control, texture, or motion data of a plurality of coded units of the target layer from signaled prediction control data associated with a group of coded units of the target layer or the at least one additional layer, or from prediction control data associated with individual coded units of the target layer or the at least one additional layer; and
  at a combiner coupled to the predictor, combining using a processor the generated prediction references with the corresponding decoded control, texture, or motion data associated with the plurality of coded units of the target layer to produce portions of a decoded picture corresponding to the plurality of coded units of the target layer,
wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream.

12. The method of claim 11, wherein
a received digital video bitstream conforms to the SVC JD8 specification, wherein coded units correspond to macroblocks or macroblock partitions and groups of coded units correspond to slices, extended such that:
the inter-layer prediction control data associated with a macroblock or macroblock partition comprise a residual_prediction_flag parameter; and
the inter-layer prediction control data associated with a slice comprise an adaptive_residual_prediction_flag parameter,
the method further comprising at the decoder omitting decoding of the residual_prediction_flag parameter in macroblock or macrobock partitions of a slice for which the adaptive_residual_prediction_flag parameter is not set, and at the predictor assuming a default value for the residual_prediction_flag parameter for all macroblocks or macroblock partitions of the slice.

13. The method of claim 11, wherein
a received digital video bitstream conforms to the SVC JD8 specification, wherein coded units correspond to macroblocks or macroblock partitions and groups of coded units correspond to slices, extended such that:
the inter-layer prediction control data associated with a macroblock or macroblock partition comprise a base_mode_flag parameter;
the inter-layer prediction control data associated with a slice comprise an adaptive_prediction_flag parameter and a default_base_mode_flag parameter,
the method further comprising at the decoder omitting decoding of the base_mode_flag parameter in macroblock or macrobock partitions of a slice for which the adaptive_prediction_ flag parameter is not set, and at the predictor assuming a value indicated by the default_base_mode_flag parameter for the base_mode_flag parameter for all macroblocks or macroblock partitions of the slice.

14. The method of claim 11, wherein
a received digital video bitstream conforms to the SVC JD8 specification, wherein coded units correspond to macroblocks or macroblock partitions and groups of coded units correspond to slices, extended such that:
the inter-layer prediction control data associated with a macroblock or macroblock partition comprise a motion_prediction_flag_l0 parameter and a motion_prediction_flag_l1 parameter; and
the inter-layer prediction control data associated with a slice comprise an adaptive_motion_prediction_flag parameter and a default_motion_prediction_flag parameter,
the method further comprising at the decoder omitting decoding of the motion_prediction_flag_l0 or motion_prediction_flag_l1 parameters in macroblock or macrobock partitions of a slice for which the adaptive motion_prediction_flag parameter is not set, and at the predictor assuming a value indicated by the default motion_prediction_flag parameter for the motion_prediction_flag_l0 and motion_prediction_flag_l1 parameters for all macroblocks or macroblock partitions of the slice.

15. A method for scalable coding of digital video, the method comprising:
at an input receiving digital video input pictures;
optionally operating a downsampler coupled to the input to generate a downsampled picture of an input picture at a lower resolution;
at a first prediction estimator coupled to either the optionally operated downsampler or the input and a first combiner that provides a plurality of previously decoded base layer pictures to be used as reference pictures, generating a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;
at a first comparer coupled to the first prediction estimator and the optional downsampler or input, computing the difference between the (optionally downsampled) input picture and the portions of a first prediction reference picture, and generating a second set of control (including prediction) and texture data associated with a plurality of the coded units of the (optionally downsampled) input picture, and control (including prediction) data associated with a group of coded units of the (optionally downsampled) input picture,
at a first combiner coupled to the first comparer and the first prediction estimator, combining using a processor the second set of generated control (including prediction) and texture data with their corresponding portions of the first prediction reference picture to generate the corresponding portions of a new base layer decoded picture;
at a second prediction estimator coupled to the input and a second combiner that provides a plurality of previously decoded enhancement layer pictures to be used as reference pictures, generating a third set of control (including prediction) and motion data prediction references associated with a plurality of the coded units of the input picture, or control data (including prediction control data) associated with a group of coded units of the input picture, and generating the portions of a second prediction reference picture that correspond to the coded units;
at a second comparer coupled to the second prediction estimator and the input, computing the difference between the input picture and the second prediction reference picture, and generating a fourth set of control (including prediction) and texture data associated with a plurality of the coded units of the input picture, and control (including prediction) data associated with a group of coded units of the input picture,
at a second combiner coupled to the second comparer and the second prediction estimator, combining the fourth set of generated control (including prediction) and texture data with their corresponding portions of the second prediction reference picture to generate the corresponding portions of a new enhancement layer decoded picture; and
at an encoder, encoding the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplexing the data into a single output bit stream,
wherein the third and fourth sets of control data include inter-layer prediction control data, and at the second prediction estimator and the second comparer setting inter-layer prediction control data values in one or more groups of coded units of the input picture such that corresponding inter-layer prediction control data values in the coded units of the input picture associated with the one or more groups of coded units of the input picture are not transmitted.

16. The method of claim 15, wherein the first and second prediction estimators, the first and second comparers, and the encoder are configured to produce and output bit stream conforming to the SVC JD 8 specification, wherein coded units correspond to macroblocks or macroblock partitions and groups of coded units correspond to slices, extended such that:

the inter-layer prediction control data associated with a macroblock or macroblock partition comprise a residual_prediction_flag parameter;

the inter-layer prediction control data associated with a slice comprise an adaptive_residual_prediction_flag parameter, the method further comprising:

at the second prediction estimator and the second comparer setting the adaptive_prediction_flag parameter to false in one or more slices:

at the encoder, omitting the residual_prediction_flag in its encoding of the macroblocks or macroblock partitions associated with the one or more slices, and at the second predictor and second comparer assuming a default value for the residual_prediction_flag parameter for all macroblocks or macroblock partitions of the one or more slices.

17. The method of claim 15, wherein the first and second prediction estimator, the first and second comparer, and the encoder are configured to produce and output bit stream conforming to the SVC JD 8 specification, wherein coded units correspond to macroblocks or macroblock partitions an groups of coded units correspond to slices, extended such that:

the inter-layer prediction control data associated with a macroblock or macroblock partition comprise a base_mode_flag parameter;

the inter-layer prediction control data associated with a slice comprise an adaptive_prediction_flag parameter and a default_base_mode_flag parameter, the method further comprising:

at the second prediction estimator and the second comparer setting the adaptive_prediction_flag parameter to false in one or more slices;

at the encoder omitting the base_mode_flag in its encoding of the macroblocks or macroblock partitions associated with the one or more slices; and at the second predictor and the second comparer assuming a value indicated by the default_base_mode_flag for the base_mode_flag parameter of all macroblocks or macroblock partitions of the one or more slices.

18. The method of claim 15 wherein the first and second prediction estimator, the first and second comparers, and the encoder are configured to produce and output bit stream conforming to the SVC JD 8 specification, wherein coded units correspond to macroblocks or macroblock partitions and groups of coded units correspond to slices, extended such that:

the inter-layer prediction control data associated with a macroblock or macroblock partition comprise a motion_prediction_flag_l0 parameter and a motion_prediction_flag_l1 parameter;

the inter-layer prediction control data associated with a slice comprise an adaptive_motion_prediction_flag parameter and a default_motion_prediction_flag parameter, the method further comprising:

at the second predictor and the second comparer setting the adaptive_motion_prediction_flag parameter to false in one or more slices;

at the encoder omitting the motion_prediction_flag_l0 or motion_prediction_flag_l1 parameters in its encoding of the macroblocks or macroblock partitions associated with the one or more slices;

and at the second predictor and the second comparer assuming a value indicated by the default_motion_prediction_flag for the motion_prediction_flag_l0 and motion_prediction_flag_l1 parameters of all macroblocks or macroblock partitions of the one or more slices.

19. A scalable video communication method comprising:

a decoding method comprising:

at an input, receiving a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;

at a decoder, decoding the received input by decoding the control data associated with a group of coded units of the target layer and the at least one additional layer, and control, texture, or motion data associated with individual coded units of the target layer and the at least one additional layer;

using a predictor coupled to the decoder, to generate prediction references for the control, texture, or motion data of a plurality of coded units of the target layer from signaled prediction control data associated with a group of coded units of the target layer or the at least one additional layer, or from prediction control data associated with individual coded units of the target layer or the at least one additional layer; and at a combiner coupled to the predictor, combining using a processor the generated prediction references with the corresponding decoded control, texture, or motion data associated with the plurality of coded units of the target layer to produce portions of a decoded picture corresponding to the plurality of coded units of the target layer, wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream;

an encoding method comprising:

at an input receiving digital video input pictures;

optionally operating a downsampler coupled to the input to generate a downsampled picture of an input picture at a lower resolution;

at a first prediction estimator coupled to either the optionally operated downsampler or the input and a first combiner that provides a plurality of previously decoded base layer pictures to be used as reference pictures, generating a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;

at a first comparer coupled to the first prediction estimator and the optional downsampler or input, computing the difference between the (optionally downsampled) input picture and the portions of a first prediction reference picture, and generating a second set of control (including prediction) and texture data associated with a plurality of the coded units of the (optionally downsampled) input picture, and control (including prediction) data associated with a group of coded units of the (optionally downsampled) input picture, at a first combiner coupled to the first comparer and the first prediction estimator, combining the second set of generated control (including prediction) and texture data with their corresponding portions of the first prediction reference picture to generate the corresponding portions of a new base layer decoded picture;

at a second prediction estimator coupled to the input and a second combiner that provides a plurality of previously decoded enhancement layer pictures to be used as reference pictures, generating a third set of control (including prediction) and motion data prediction references associated with a plurality of the coded units of the input picture, or control data (including prediction control data) associated with a group of coded units of the input picture, and generating the portions of a second prediction reference picture that correspond to the coded units;

at a second comparer coupled to the second prediction estimator and the input, computing the difference between the input picture and the second prediction reference picture, and generating a fourth set of control (including prediction) and texture data associated with a plurality of the coded units of the input picture, and control (including prediction) data associated with a group of coded units of the input picture, at a second combiner coupled to the second comparer and the second prediction estimator, combining the fourth set of generated control (including prediction) and texture data with their corresponding portions of the second prediction reference picture to generate the corresponding portions of a new enhancement layer decoded picture; and at an encoder, encoding the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplexing the data into a single output bit stream, wherein the third and fourth sets of control data include inter-layer prediction control data, and at the second prediction estimator and the second comparer setting inter-layer prediction control data values in one or more groups of coded units of the input picture such that corresponding inter-layer prediction control data values in the coded units of the input picture associated with the one or more groups of coded units of the input picture are not transmitted;

connecting the output of the encoding method to the input of the decoding method; and at the second prediction estimator and the second comparer of the encoding method using telescopic inter-layer prediction control data values in more or less groups of coded units of the input picture, depending on the bit rate available in the communication network.

20. A method for scalable video communication over a system comprising:

a communication network;

a decoding system for decoding of scalable digital video, the system comprising:

an input configured to receive a scalable digital video bitstream comprising groups of coded units of a quality or spatial enhancement target layer and at least one additional layer, the digital video bitstream containing control data (including prediction control data) associated with a group of coded units and control (including prediction), texture, or motion data associated with individual coded units;

a decoder coupled to the input, wherein the decoder is configured to decode the control data associated with a group of coded units of the target layer and the at least one additional layer, and control, texture, or motion data associated with individual coded units of the target layer and the at least one additional layer;

a predictor coupled to the decoder, wherein the decoder is configured to generate prediction references for the control, texture, or motion data of a plurality of coded units of the target layer as signaled prediction control data associated with a group of coded units of the target layer or the at least one additional layer, or from prediction control data associated with individual coded units of the target layer or the at least one additional layer; and a combiner coupled to the predictor, wherein the combiner is configured to combine the generated prediction references with the corresponding decoded control, texture, or motion data associated with the plurality of coded units of the target layer to produce portions of a decoded picture corresponding to the plurality of coded units of the target layer, wherein the prediction control data associated with the groups of coded units of the target layer or the at least one additional layer and the prediction control data associated with individual coded units of the target layer or the at least one additional layer include inter-layer prediction control data, and wherein the predictor is configured to use values indicated by the inter-layer prediction control data associated with a group of coded units of the target layer when the corresponding inter-layer prediction control data associated with individual coded units of the group of coded units of the target layer are not present in the digital video bitstream;

an encoding system for scalable coding of digital video, the system comprising:

an input configured to receive digital video input pictures;

an optionally operated downsampler coupled to the input, wherein the down sampler is configured to generate a downsampled picture of an input picture at a lower resolution;

a first prediction estimator coupled to either the optional downsampler or the input and a first combiner that provides a plurality of previously decoded base layer pictures to be used as reference pictures, wherein the first prediction estimator is configured to generate a first set of control (including prediction) and motion data prediction references associated with a plurality of the coded units of the (optionally downsampled) picture, or control data (including prediction control data) associated with a group of coded units of the (optionally downsampled) picture, and to generate the portions of a first prediction reference picture that correspond to the coded units;

a first comparer coupled to the first prediction estimator and the optional downsampler or input, wherein the first comparer is configured to compute the difference between the (optionally downsampled) input picture and the portions of a first prediction reference picture, and generate a second set of control (including prediction) and texture data associated with a plurality of the coded units of the (optionally downsampled) input picture, and control (including prediction) data associated with a group of coded units of the (optionally downsampled) input picture, a first combiner coupled to the first comparer and the first prediction estimator wherein the first combiner is configured to combine the second set of generated control (including prediction) and texture data with their corresponding portions of the first prediction reference picture to generate the corresponding portions of a new base layer decoded picture;

a second prediction estimator coupled to the input and a second combiner that provides a plurality of previously decoded enhancement layer pictures to be used as reference pictures, wherein the second prediction estimator is configured to generate a third set of control (including prediction) and motion data prediction references associated with a plurality of the coded units of the input picture, or control data (including prediction control data) associated with a group of coded units of the input picture, and also generating the portions of a second prediction reference picture that correspond to the coded units;

a second comparer coupled to the second prediction estimator and the input, wherein the second comparer is configured to compute the difference between the input picture and the second prediction reference picture, and generate a fourth set of control (including prediction) and texture data associated with a plurality of the coded units of the input picture, as well as control (including prediction) data associated with a group of coded units of the input picture, a second combiner coupled to the second comparer and the second prediction estimator, wherein the second combiner is configured to combine the fourth set of generated control (including prediction) and texture data with their corresponding portions of the second prediction reference picture to generate the corresponding portions of a new enhancement layer decoded picture; and an encoder configured to encode the first set of control (including prediction) and motion data and the second set of control (including prediction) and texture data to produce a base layer bit stream, the third set of control (including prediction) and motion data and the fourth set of control (including prediction) and texture data to produce an enhancement layer bit stream, and multiplex the data into a single output bit stream, wherein the third and fourth sets of control data include inter-layer prediction control data, and wherein the second prediction estimator and the second comparer are further configured to set inter-layer prediction control data values in one or more groups of coded units of the input picture such that corresponding inter-layer prediction control data values in the coded units of the input picture associated with the one or more groups of coded units of the input picture are not transmitted; and a Scalable Video Communication Server ("SVCS") connected to the encoding system and the decoding system over the communication network, the method comprising: at the SVCS, replacing using a processor one or more enhancement layer slices received by the encoding system with slices that only signal telescopic inter-layer prediction and do not contain macroblock texture or motion data, prior to forwarding them to the decoding system.

21. A computer program product, comprising a computer usable medium having a computer readable program code embodied therein, said computer readable program code adapted to be executed to implement at least one of the method claims 11-20.

* * * * *